Patented May 24, 1932

1,859,742

UNITED STATES PATENT OFFICE

MAX ALBERT KUNZ, OF MANNHEIM, AND KARL KÖBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

PRODUCTION OF NITROGENOUS DYESTUFFS

No Drawing. Application filed February 16, 1928, Serial No. 254,891, and in Germany February 18, 1927.

We have found that new and very valuable vat dyestuffs are obtained with very good yields when polyhalogen pyranthrones or derivatives thereof are heated with such quantities of nitrogen-containing compounds in which at least one reactive hydrogen atom is connected to the nitrogen atom, that several or all halogen atoms contained in the polyhalogen pyranthrones or derivatives thereof are substituted by the nitrogen containing radicles. As nitrogen-containing compounds of the said kind for instance isatines, carbazols, amino-dianthrimides, amino-anthrimide carbazols or amino-anthraquinones may be used. The halogen atoms, however, may also be substituted by ammonia in which case the nitrogen-containing radicle is the amino group which may also be introduced by the action of toluene sulfamide on halogen pyranthrones. The polyhalogen pyranthrones used in the present process may be obtained by halogenating pyranthrone or its derivatives, preferably in solvents such as chlorsulfonic acid and with the aid of halogen transferrers, such as sulfur, phosphorus, selenium, iodine, iron and the like. The reaction is carried out most advantageously in dissolving or suspending media of high boiling point such as nitrobenzene, naphthalene and the like, and preferably in the presence of catalysts such as copper or its compounds, or of acid-binding agents or both. The reaction proceeds in a particularly smooth manner and in a much shorter time, very uniform products being at the same time obtained, when increasing the amount of copper or its compounds over that usually employed for promoting like reactions; thus amounts of copper corresponding to one half of the atomic weight of copper per each halogen atom contained in the polyhalogen pyranthrones may advantageously be used in the form of free copper or its compounds. The new products dissolve in concentrated sulfuric acid to a mostly blue or violet solution and give a violet vat. Generally speaking they dye cotton from blue to violet or black shades of excellent fastness.

The new dyestuffs are essentially different from those in which only one halogen atom is substituted by a nitrogenous radicle by their deeper shades and better fastness.

The following examples will further illustrate the nature of this invention, but the invention is not limited to these examples. The parts are by weight.

Example 1

A suspension of 64 parts of tribrom-pyranthrone, 30 parts of sodium acetate, 1 part of copper carbonate and 66 parts of alpha-amino-anthraquinone in 500 parts of nitrobenzene is boiled for 18 hours while stirring. After cooling, the reaction product is filtered by suction and the inorganic constituents are removed by washing with water. The dyestuff obtained corresponding to the formula:

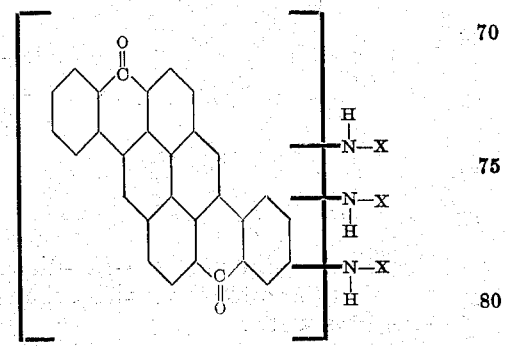

wherein X represents an alpha-anthraquinonyl radicle, is a violet-black powder which dissolves in concentrated sulfuric acid to a blue solution and dyes cotton violet-black shades from a violet vat.

Example 2

72 parts of tetrabrom-pyranthrone are boiled for 6 to 8 hours, while stirring, in 500 parts of nitrobenzene mixed with 40 parts of sodium acetate, 15 parts of copper carbonate and 100 parts of 1-amino-4-methoxy-anthraquinone. After cooling, the reaction product is sucked off and worked up as described in Example 1. The dyestuff obtained which is free from halogen and corresponds to the formula:—

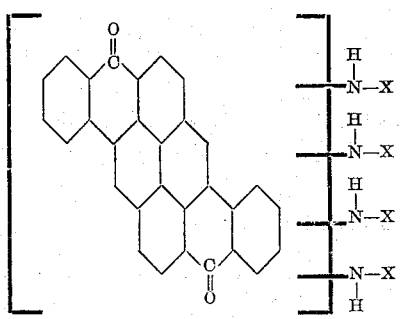

wherein X represents an alpha-4-methoxy-anthraquinonyl radicle, is a bluish-black powder giving a blue solution in concentrated sulfuric acid and dyes cotton pure black shades of excellent fastness from a violet vat.

*Example 3*

A suspension of 56 parts of dibrom-pyranthrone, 80 parts of 4-amino-1.1'-dianthrimide, 20 parts of sodium acetate, and 1 part of copper carbonate in 500 parts of nitrobenzene is boiled for 24 hours while stirring. After cooling, the reaction product is worked up in the usual manner. The dyestuff obtained which is free from halogen and corresponds to the formula:—

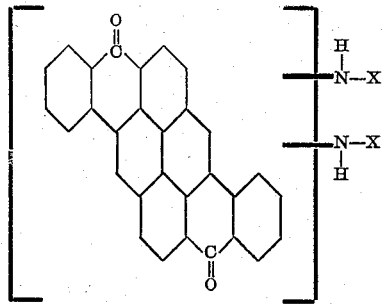

wherein X represents a 4-1.1'-dianthrimide radicle, dyes cotton dark violet shades of excellent fastness.

*Example 4*

36 parts of tetrabrom-pyranthrone are boiled for about 6 hours, while stirring, in 1000 parts of nitrobenzene with 30 parts of sodium acetate, 7 parts of copper oxid and 46 parts of α-amino-anthraquinone and the reaction product is worked up as described in Example 1. The dyestuff obtained in the amount theoretically required corresponds to the formula:—

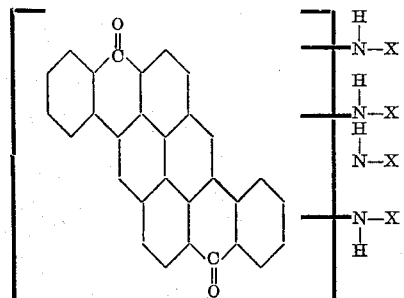

wherein X represents an alpha-anthraquinonyl radicle, and is a violet-black powder dissolving to a violet solution in concentrated sulfuric acid and dyes cotton from a red-violet vat remarkably fast black shades with a violet tinge.

What we claim is:

1. As new articles of manufacture, nitrogenous vat dyestuffs in which a pyranthrone radicle is combined with at least two anthraquinone radicles by nitrogen linkages.

2. As new articles of manufacture, nitrogenous vat dyestuffs in which a pyranthrone radicle is combined with four anthraquinone radicles by nitrogen linkages.

In testimony whereof we have hereunto set our hands.

MAX ALBERT KUNZ.
KARL KÖBERLE.